(12) United States Patent
Lee et al.

(10) Patent No.: US 8,806,658 B2
(45) Date of Patent: Aug. 12, 2014

(54) METHOD OF INSTALLING SOFTWARE FOR USING DIGITAL CONTENT AND APPARATUS FOR PLAYING DIGITAL CONTENT

(75) Inventors: Choong-hoon Lee, Seoul (KR); Jun Yao, Suwon-si (KR); Yong-kuk You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 895 days.

(21) Appl. No.: 12/019,279

(22) Filed: Jan. 24, 2008

(65) Prior Publication Data

US 2008/0288784 A1 Nov. 20, 2008

(30) Foreign Application Priority Data

May 17, 2007 (KR) .................. 10-2007-0048242

(51) Int. Cl.
*G06F 7/04* (2006.01)
(52) U.S. Cl.
USPC ............................................... 726/29
(58) Field of Classification Search
USPC ............................. 709/246; 726/27
See application file for complete search history.

(56) References Cited

U.S. PATENT DOCUMENTS

| | | | |
|---|---|---|---|
| 6,829,708 B1 | 12/2004 | Peinado et al. | |
| 6,944,478 B1 | 9/2005 | Durand | |
| 7,242,766 B1* | 7/2007 | Lyle .................................. | 380/2 |
| 2004/0128395 A1* | 7/2004 | Miyazaki ..................... | 709/229 |
| 2004/0153644 A1 | 8/2004 | McCorkendale et al. | |
| 2006/0212931 A1 | 9/2006 | Shull et al. | |
| 2007/0033419 A1* | 2/2007 | Kocher et al. ................. | 713/193 |
| 2007/0204064 A1* | 8/2007 | Mail et al. ..................... | 709/246 |
| 2009/0064341 A1* | 3/2009 | Hartung et al. ................. | 726/27 |

FOREIGN PATENT DOCUMENTS

| | | |
|---|---|---|
| WO | 2005/041001 A | 5/2005 |
| WO | 2005/089061 A2 | 9/2005 |
| WO | 2006/048039 A1 | 5/2006 |

OTHER PUBLICATIONS

Communication dated Dec. 19, 2011, issued by the State Intellectual Property Office of the People's Republic of China, issued in corresponding Chinese Patent Application No. 200810003085.3.
Communication dated Mar. 7, 2012 from the European Patent Office in counterpart European application No. 08100557.1.
Communication dated Nov. 14, 2012, issued by the European Patent Office in counterpart European Patent Application No. 08100557.1.
Communication dated Aug. 29, 2013, issued by the Korean Intellectual Property Office in corresponding Application No. 10-2007-0048242.
Communication dated Feb. 28, 2014 issued by the Korean Intellectual Property Office in counterpart Korean Application No. 10-2007-0048242.

\* cited by examiner

*Primary Examiner* — Brandon Hoffman
(74) *Attorney, Agent, or Firm* — Sughrue Mion, PLLC

(57) ABSTRACT

A method of and apparatus for installing software for using digital content and are provided. The method of installing software for using digital content includes: transmitting a request for the software; transmitting security information indicating a security status of a device in which the software is to be installed; and receiving the software from an external apparatus that received the request and security information. According to the method and apparatus, the software can be dynamically securely installed, thereby allowing a variety of digital contents to be used and enhancing the utilization of the device.

28 Claims, 6 Drawing Sheets

METHOD OF INSTALLING SOFTWARE FOR USING DIGITAL CONTENT AND APPARATUS FOR PLAYING DIGITAL CONTENT

CROSS-REFERENCE TO RELATED PATENT APPLICATIONS

This application claims priority from Korean Patent Application No. 10-2007-0048242, filed on May 17, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to receiving software for using digital content from a software transmission server and installing the software, and more particularly, to transmitting security information indicating the security status of a device to a software transmission server, and if the security information of the device satisfies a security condition required by software, the software transmission server transmits the software to a device so that the software can be installed in the device.

2. Description of the Related Art

As illegal copying of digital content in the digital content industry has recently increased, a variety of technologies for protecting digital content have been studied and developed. Such technologies include a conditional access system (CAS) for protecting broadcasting contents, digital rights management (DRM) for determining whether to allow digital content to be used according to rights on the digital content, and digital content protection technologies for storage media such as a content scrambling system (CSS), content protection for recordable media (CPRM), and an advanced access content system (AACS).

These technologies for protecting digital content usually employ encryption technologies and the like, and control the use of digital content so that only an authorized user or device can use the digital content only by a permitted method.

In most current content devices, a predetermined content protection system is fixedly mounted and used. In this fixed content protection system, digital content that can be used is also fixed beforehand, thereby hindering a user from freely using digital content and selecting a service. In other words, if the DRM technology is applied to digital content and a device does not support the DRM technology, then the digital content cannot be used in the device. Also, digital content used by the device cannot be moved to and used in another device supporting other DRM technologies. For example, digital content to which a DRM solution of a company A is applied cannot be used in a device in which a DRM solution of a company B is implemented.

That is, in this fixed content protection system, the types of digital content that can be used in the device are limited, thereby causing inconvenience to users.

This inconvenience is expected to become more serious in the case of networks including digital content devices. Nowadays, broadcasting services through the Internet such as Internet protocol television (IPTV) services are provided, and it is also expected that digital content devices will access a variety of services through wired and/or wireless networks. In this environment, if a predetermined content protection technology such as a predetermined DRM is mounted in a predetermined device, more services that can be used by a user will be restricted.

As a method of solving this problem, a content protection system can be provided in the form of software or firmware so that the content protection system can be installed in a device. For example, a user is allowed to freely install and use a software content protection system, which is applied to digital content which the user wants to use, in a device. Accordingly, the user can use a variety of digital contents irrespective of the type of the content protection system.

FIG. 1 is a diagram illustrating a conceptual internal structure of a content device 100 which plays digital content by installing a software digital content protection system according to conventional technology.

The content device 100 has a structure in which one or more different software content protection systems can be installed, and when digital content is desired to be used, the digital content is decrypted or the use of the digital content is controlled by operating a software content protection system such as DRM software.

The content device 100 includes a software execution unit 110 capable of executing software and a software storage unit 120 capable of storing software. DRM software, which is executed in the software execution unit 110, includes a license processing unit 111 processing a content key or license, a content decrypting unit 112 decrypting digital content encrypted for protection, and a content output unit 113 for playing digital content or transferring digital content to an external device.

The structure for using digital content protected by DRM in the content device 100 will now be explained. When the use of digital content such as playing or transferring to an external device of the digital content is requested, the content device 100 executes DRM software for controlling the use of the digital content in the software execution unit 110. The license processing unit 111 of the DRM software interprets a license for the usage right of the digital content, thereby determining whether the content can be used. If the use is permitted, the digital content is decrypted in the content decrypting unit 112 of the DRM software. The decrypted digital content is played or transferred to an external device through the content output unit 113. The example of the DRM software is explained here in order to help the understanding of the present invention, but the content protection software may be other software content protection systems such as CAS software.

The content protection system such as the DRM, defines the requirements that the devices should comply with for the safe distribution of digital content, and the device should be manufactured in accordance with these requirements. Representative examples of these requirements include a robustness rule and a compliance rule. Each content protection system standardization organization or DRM solution company defines the robustness rule and compliance rule for each system. If a device implementing the content protection system does not comply with these requirements, the device cannot be certified by the standardization organizations or DRM companies.

In particular, the robustness rule relates to a security level which a system should comply with. For example, robustness rule describes how strongly a secret key of a device or a key for digital content or a decrypted digital content must be protected in the device.

Different software content protection systems may have different robustness rules. Content protection software handling more important data requires a higher security level, while content protection software handling less important data requires a relatively lower security level.

However, since the security feature of a content device is determined when the device is manufactured, it is difficult for a content device in which a variety of content protection software systems are to be installed to satisfy the security levels of all content protection software system at the time of manufacturing the content device. Nevertheless, content protection software should not be used in a device which does not satisfy the security defined by the robustness rule; therefore it is necessary to solve this problem.

SUMMARY OF THE INVENTION

The present invention provides a method of installing content protection software only in a device which satisfies a predetermined security level. That is, the present invention provides a method and apparatus by which in a process in which a device receives content protection software from a software server and installs the software in the device, the device transmits security information indicating the security status of the device to the server, and if the security information of the device satisfies a security condition required by the content protection software, the software server transmits the software to the device so that the software can be installed in the device.

The present invention also provides a method of transmitting content protection software (hereinafter referred to as "software") to a content device which executes the software for playing and using digital content, and installing the software in the device. Different software systems require different device security levels, and different devices also have different security levels. The present invention suggests a method by which in a process in which software for using digital content is installed through a software server or installation software, the security level of a device is examined and only when the security level required by the software is satisfied, the software is transmitted to the device and installed in the device.

According to an aspect of the present invention, there is provided a method of installing software for using digital content, the method including: transmitting a signal requesting the software; transmitting security information indicating the security status of a device in which the software is to be installed; and receiving the software from an external apparatus receiving the request signal and the security information.

The security information may express the security status of the device in a plurality of levels or as information indicating whether each security item is protected in the device.

The method may further include authenticating the device, wherein the security information is included in a certificate of the device which is transmitted for authentication.

The certificate of the device may include at least one of an identification code of the device, a public key of the device, and a digital signature guaranteeing the genuineness of the certificate.

In the receiving of the software, additional information on the software and a digital signature for preventing falsification or forgery of the software may be received.

The additional information may include copy permission information indicating whether the software can be copied to another device other than the current device, or required security information indicating a security status of the device required by the software.

The method may further include comprising installing the received software in a storage unit included in the device.

The method may further include storing the software separately from the additional information according to the copy permission information included in the additional information so that the software can be copied to another device other than the current device.

The method may further include verifying falsification or forgery of the received software.

According to another aspect of the present invention, there is provided a method of installing software for using digital content, the method including: receiving a request signal for the software and first security information indicating the security status of a device in which the software is to be installed; comparing the received first security information with second security information indicating a security status of the device required by the software; and transmitting the software according to the comparison result.

The security information may express the security status of the device in a plurality of levels or as information indicating whether each security item such as device key, content key and clear content is securely protected in the device.

In the transmitting of the software, if the security information expresses the security status of the device in a plurality of levels, the software may be transmitted when the level of the first security information is equal to or higher than the level required by the second security level.

In the transmitting of the software, if the security information expresses the security status of the device as information indicating whether each security item is protected in the device, the software may be transmitted when the first security information satisfies the protection of each item required by the second security information.

The software to be transmitted may be encrypted and then transmitted, and additional information on the software may be transmitted together.

The additional information may include copy permission information indicating whether the software can be copied to another device other than the current device, or the second security information.

The method may further include examining whether the device requesting the software is included in a revocation list of devices, wherein according to the examination result, if the device is included in the list, the transmission of the software is refused.

The method may further include authenticating the device requesting the software, wherein according to the authentication result, if the authentication failed, the transmission of the software is refused.

The method may further include performing a digital signature for determining whether the software to be transmitted is falsified or forged.

According to another aspect of the present invention, there is provided an apparatus for playing digital content including: a software request unit transmitting a signal requesting software for using the digital content; a security information transmission unit transmitting security information indicating the security status of a device in which the software is to be installed; and a software reception unit receiving the software from an external apparatus receiving the request signal and the security information.

The software request unit may further include an authentication processing unit performing authentication of the device which is requested by the external apparatus.

The software reception unit may further include a software storage unit in which the software received by the software reception unit is installed.

The software reception unit may further include a verification unit verifying whether the received software is falsified or forged.

According to another aspect of the present invention, there is provided an apparatus for transmitting software including: a reception unit receiving a request signal for the software for using digital content, and first security information indicating the security status of a device in which the software is to be installed; a security determination unit comparing the first security information received by the reception unit with second security information indicating a security status of the device required by the software; and a software transmission unit transmitting the software according to the comparison result determined in the security determination unit.

The reception unit may further include a validity verification unit examining whether the device requesting the software is included in a revocation list of devices.

The reception unit may further include an authentication unit authentication the device requesting the software.

The apparatus may further include: an encryption unit encrypting the software to be transmitted; and an additional information processing unit adding additional information on the software to the software to be transmitted.

The software transmission unit may further include a digital signature unit performing a digital signature for determining whether the software to be transmitted is falsified or forged.

According to another aspect of the present invention, there is provided a computer readable recording medium on which security information indicating the security status of a device in which software for using digital content is installed and a data structure including at least one of an identification code of the device as authentication information, a public key of the device, and a digital signature guaranteeing the genuineness of the authentication information are recorded.

According to another aspect of the present invention, there is provided a computer readable recording medium on which an execution code of software for using digital content and a data structure, including copy permission information indicating whether the software can be copied to another device other than a current device in which the software is to be installed, or required security information indicating a security status of the device requesting the software, as additional information on the software are recorded.

According to still another aspect of the present invention, there is provided a computer readable recording medium having embodied thereon a computer program for executing the method of installing software for using digital content.

BRIEF DESCRIPTION OF THE DRAWINGS

The above and other aspects of the present invention will become more apparent by describing in detail exemplary embodiments thereof with reference to the attached drawings in which.

Figure 1:
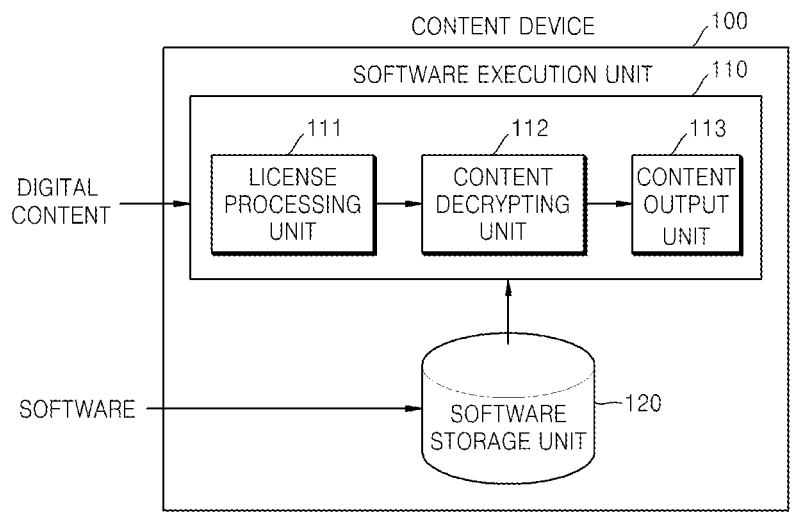
FIG. 1 is a diagram illustrating a conceptual internal structure of a content device which plays digital content by installing a digital content protection system in the form of software according to related art technology.

In the drawings, whenever the same element reappears in subsequent drawings, it is denoted by the same reference numeral. Though the drawings illustrate exemplary embodiments of the present invention, the drawings are not drawn according to a reduced scale, and the thicknesses of layers and regions may be exaggerated for clarity.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

Figure 2:
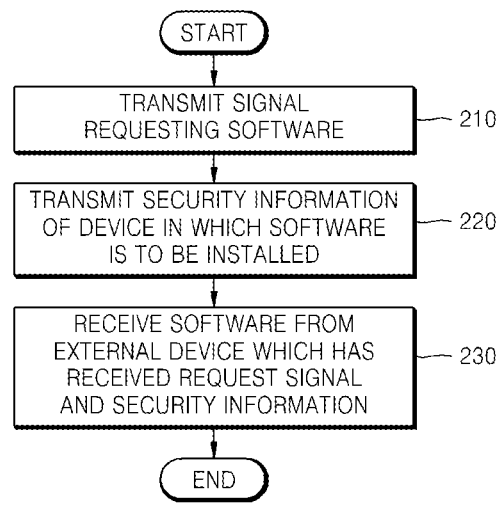
FIG. 2 is a flowchart for explaining an operation method of a device in a process of installing software for using digital content according to an exemplary embodiment of the present invention.

FIG. 2 is a flowchart for explaining an operation method of a device in a process of installing software for using digital content according to an exemplary embodiment of the present invention.

Referring to FIG. 2, according to the current exemplary embodiment, when a device requests transmission from a software transmission server of software for using digital content, security information of the device is transmitted together with the request, thereby allowing the security level of the device in which the software is to be installed to be examined in advance.

In operation 210, a signal requesting software for using digital content is transmitted. That is, since the software required for decrypting of digital content desired to be used is not fixedly mounted on the device, the transmission of the software based on the type of a protection technology applied to the input digital content is dynamically requested.

In operation 220, security information indicating the security status of the device in which the software is to be installed is transmitted.

The security information of the device is information related to security that is needed in order to determine whether the device satisfies the security condition required by the software when the device wants to install the software in order to use protected digital content. The security information can be defined in a variety of forms. For example, the security information can be defined in the form of a security level (score) by evaluating the overall security degree of the device, or after security factor items are defined, a provider of the software may be made to determine whether each item is satisfied. The security information of the device should be assessed and given by a certified authentication organization.

First, as an example of a method of expressing the security information as an overall security level (score) of a device, the security information of the device can be expressed in the form of a security level (score) according to a predetermined criterion, by evaluating the overall security of the device. For example, the security level (score) may be defined as 10 levels from 1 to 10, and after evaluating the security of a device, if the security is at a lowest level, level 1 may be given, and if the security is at a highest level, level 10 may be given as the security level (score) of the device. In this case, if the security level required by the software is level 5, the software cannot be installed in a device having a security level in a range from level 1 to level 4, and can be installed only in a device having a security level in a range from level 5 to level 10.

As an example of a method of defining a security factor item, each security item required by a content protection system can be defined when security information is expressed. By using these security items, a provider of the software determines whether the device satisfies each item.

For example, it is assumed that the security items required by a content protection system are defined as the following five items:
1. whether a device key is protected;
2. whether a content key is protected;
3. whether decrypted digital content is protected on a system bus;
4. whether time information is protected; and
5. whether software is protected.

In this case, the security information may be expressed as a bit value indicating whether each security item is satisfied. If a predetermined security item is satisfied, a bit corresponding to the item may be set to 1, or else the bit may be set to 0. That is, when five security items are defined as described above, the security information of the device can be expressed as a five-bit structural body, and the security information required by the software can also be expressed as a five-bit value as described above. Then, by determining whether the device satisfies the security for the items required by the software, the software can be installed only when securities for all the items are satisfied.

In addition to the one-bit expression indicating whether each security item is satisfied as described above, the expression can be further expanded to express a security level (score) in relation to each security requirement item. For example, in the case described above, the degree of satisfaction in relation to each item can be defined and expressed as a level in a range from level 1 (low) to level 10 (high). In this case, the security information required by the software is also expressed as a level (score) as described above in relation to each item. Then, if the security level provided by the device is higher than the security level required by the software in all security items, the software may be installed. In this case, the security level required by the software is defined based on a robustness rule defined by a content protection software company or standardization organization.

In operation 230, the software is received from the external apparatus which has received the security information and the software request signal described above.

Figure 3:
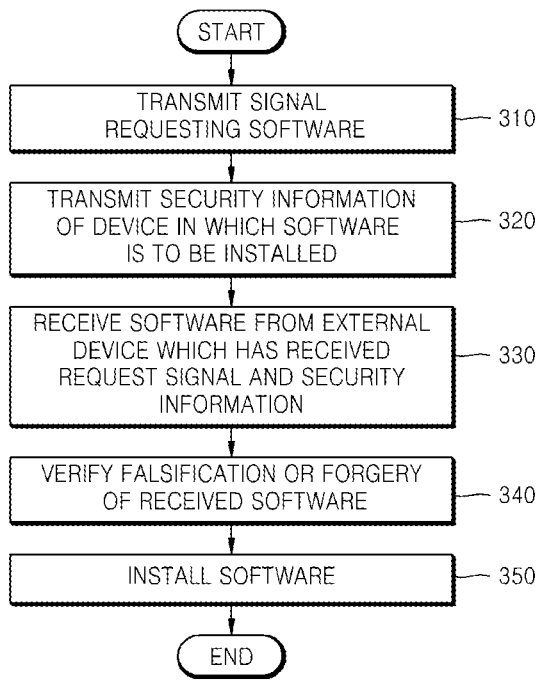
FIG. 3 is a detailed flowchart for explaining a method of installing software for using digital content according to an exemplary embodiment of the present invention.

FIG. 3 is a detailed flowchart for explaining a method of installing software for using digital content according to an exemplary embodiment of the present invention.

FIG. 3 illustrates a process of installing software through an external apparatus such as a server. Transmission of software is performed in the following sequence.

(1) A content device requests software, which is necessary for using encrypted and protected digital content, from a server in operation 310.

(2) At the same time, the security information of the content device is transmitted in operation 320. The device security information may be included in a device certificate and transmitted. In this case, the server may request authentication of the device by using the certificate of the content device, and if the authentication failed, the process of transmitting the software is stopped.

Then, as will be explained in detail later, the server determines whether the device security level of the content device requesting the software satisfies the security level required by the requested software, and transmits the software.

(3) The content device receives the software from the server in operation 330. In this case, the software may be encrypted and then transmitted, and a digital signature for protecting the software from falsification or forgery may be transmitted together.

(4) Whether the software is falsified or forged is determined by using the received digital signature in operation 340.

(5) The verified software is stored in a predetermined storage unit and then, installed in operation 530.

In this case, as will be explained later, the software may be stored separately from received additional information according to copy permission information included in the received additional information, so that the received software can be copied to another device other than the current device.

In the process described above, the security information of the device can be included in the certificate of the device which is used in the authentication process, and can be transmitted together. In this case, basic information included in the certificate of the device may be formed as illustrated in FIG. 4.

Figure 4:
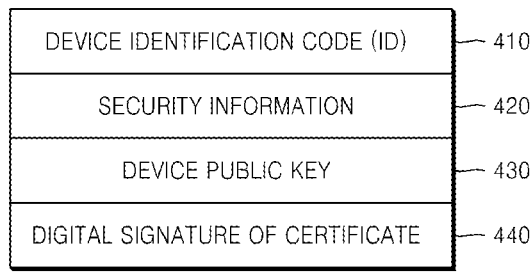
FIG. 4 is a diagram illustrating a data structure of a certificate which is transmitted when authentication of a device is requested according to an exemplary embodiment of the present invention.

FIG. 4 is a diagram illustrating a data structure of a certificate which is transmitted when authentication of a device is requested according to an exemplary embodiment of the present invention.

The certificate of the device may include a device identification code 410 allowing the device to be distinguished, device security information 420 indicating the security level of the device, a public key 430 of the device, and a digital signature 440 of an authentication organization.

As described above, the security information may be expressed as a level value indicating whether the level of the security is high or low, or may be defined such that whether factors to be individually protected are protected, including whether a device key, a content key, or decrypted digital content is protected, can be indicated.

Figure 5:
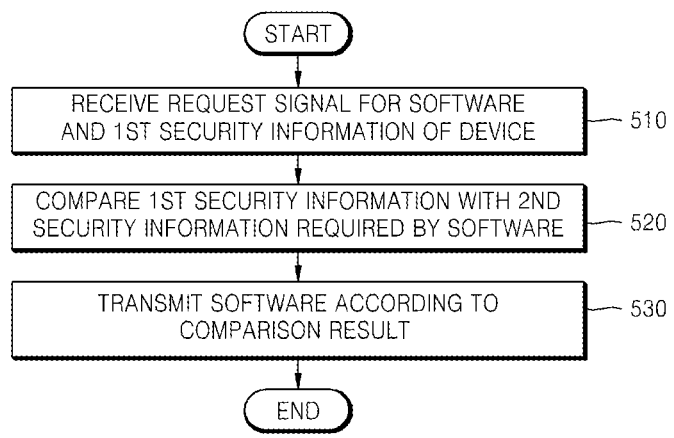
FIG. 5 is a flowchart for explaining an operation method of a software transmission server in a process of installing software for using digital content according to an exemplary embodiment of the present invention.

FIG. 5 is a flowchart for explaining an operation method of a software transmission server in a process of installing software for using digital content according to an exemplary embodiment of the present invention.

Referring to FIG. 5, the method includes receiving a request signal for software for using digital content and first security information indicating the security state of a device in which the software is to be installed (operation 510), comparing the received first security information with second security information indicating a security status of the device required by the software (operation 520), and an transmitting the software according to the comparison result (operation 530).

The method will now be explained in more detail with reference to FIG. 6.

Figure 6:
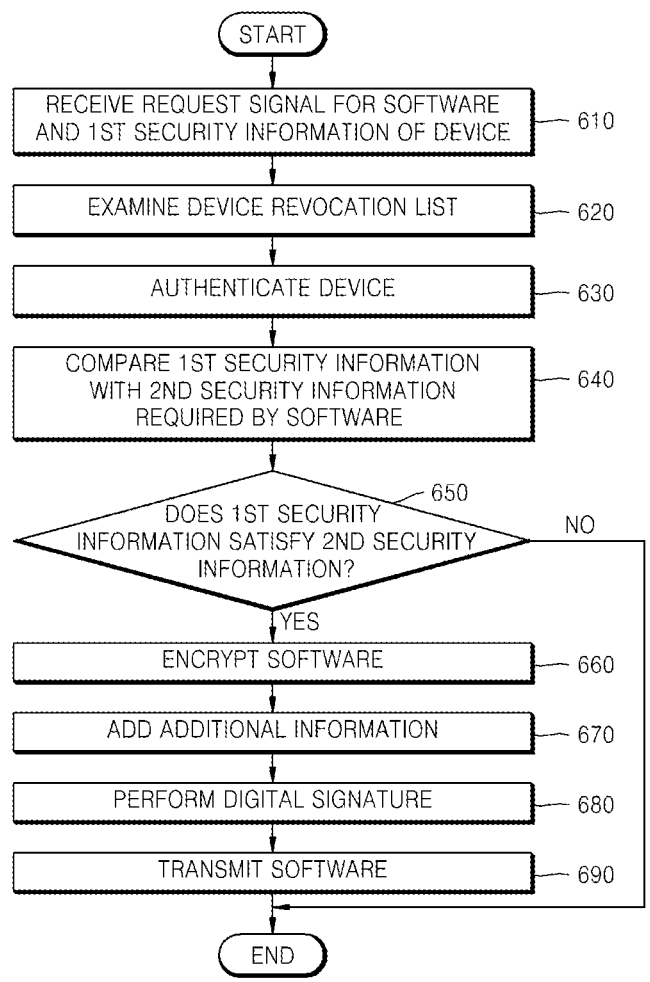
FIG. 6 is a detailed flowchart for explaining a method of installing software for using digital content according to another exemplary embodiment of the present invention.

FIG. 6 is a detailed flowchart for explaining a method of installing software for using digital content according to another exemplary embodiment of the present invention.

In operation 610, a signal dynamically requesting transmission of software according to the type of a protection technology which is required for decrypting digital content desired to be used is received. Also, security information indicating the security status of the device in which the software is to be installed is received as first security information. Here, the security information is the same as described above.

In operation 620, a list of revoked devices is examined. The list of revoked devices is a list including device information on devices which are attacked by hackers or whose keys are not secure anymore. A device included in this revocation list means that the device is not safe. Accordingly, it is examined whether the device requesting the software is included in the revocation list of devices, and if the device is included in the list, transmission of the software is refused.

In operation 630, the device is authenticated. If the authentication of the device is failed, request for transmission of the software is refused.

In operation 640, the received first security information is compared with second security information indicating the security status of the device required by the software.

In operation 650, it is determined whether the requirements of the second security information are satisfied by the first security information that is the security information of the device. In the case where the security information expresses the security status of the device in a plurality of levels, the software is transmitted when the level of the first security information is equal to or higher than the level required by the second security information.

In the case where the security information expressed the security status of the device as whether each security item is protected, the software is transmitted when the first security information satisfies the protection requirement of each item required by the second security information.

In operation 660, when the result of the comparison of the first security information with the second security information indicates that the security requirements are satisfied, the software is encrypted.

In operation 670, copy permission information indicating whether the software can be copied to another device other than the current device, or the second security information which is the security information required by the software can be added to the encrypted software so that the information can be transmitted together. The additional information will be explained in more detail later with reference to FIG. 7.

In operation 680, a digital signature for determining whether the software to be transmitted is falsified or forged is performed, and when necessary, signature information which is calculated in advance by performing signature of the software can be transmitted together with the software.

In operation 690, the software is finally transmitted to the device.

Figure 7:
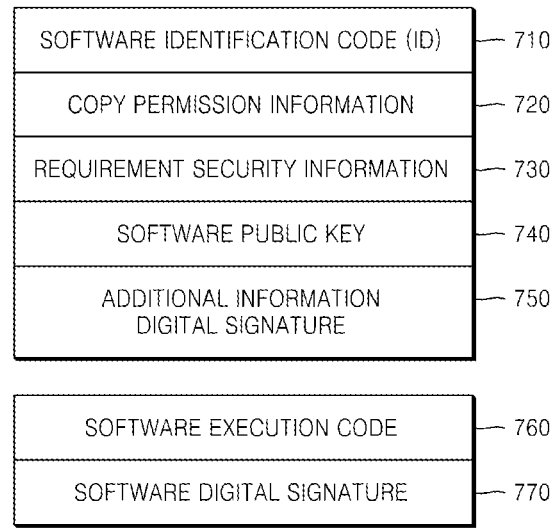
FIG. 7 is a diagram illustrating a structure of data which is transmitted when software is transmitted according to an exemplary embodiment of the present invention.

FIG. 7 is a diagram illustrating a structure of data which is transmitted when software is transmitted according to an exemplary embodiment of the present invention.

When software is transmitted from an external apparatus, the software can be encrypted and transmitted for security reasons, and additional information 710 through 750 indicating whether copying of the software is permitted and device security information required by the software can be transmitted. The additional information, including a software identification code 710, copy permission information 720 indicating whether the software can be copied to another device other than the current device after the software is transmitted, and security information 730 required by the software, may be included. Also, a software public key 740 in relation to a secret key which the software itself includes, and a signature 750 of an authentication organization in relation to additional information can be included so that the software public key 740 and the signature 750 are used as a certificate of the software itself A software execution code 760 which is to be transmitted is encrypted and then, transmitted, and a software digital signature 770 is included so that falsification or forgery of the software can be determined. Accordingly, the content device which receives the software installs the software only when the software digital signature 770 is examined and it is confirmed that the software is neither falsified nor forged.

Figure 8:
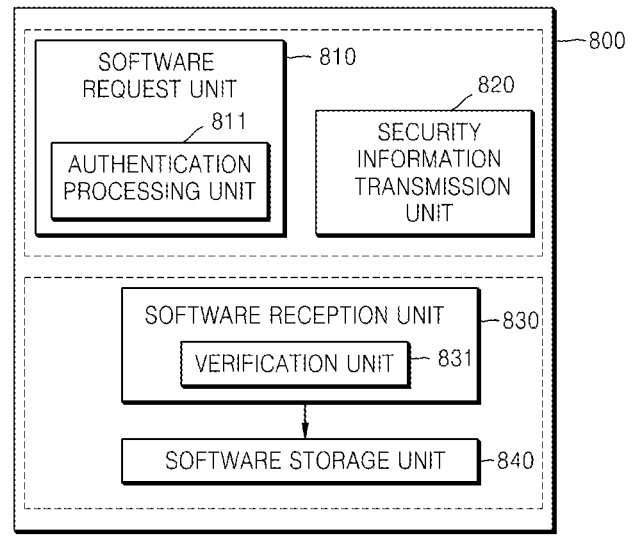
FIG. 8 is a functional block diagram of an apparatus for playing digital content in which software for using digital content is installed according to an exemplary embodiment of the present invention.

FIG. 8 is a functional block diagram of an apparatus 800 for playing digital content in which software for using digital content is installed according to an exemplary embodiment of the present invention.

The content playing apparatus 800 includes transmission units 810 and 820, and reception units 830 through 850, and a software request unit 810 including an authentication processing unit 811, a security information transmission unit 820, a software reception unit 830 including a verification unit 831 verifying software, and a software storage unit 840. The software request unit 810 transmits a request signal for software for using protected digital content, and the authentication processing unit 811 is performs authentication of a device when a server requests authentication of the device.

The security information transmission unit 820 transmits security information indicating the security status of a device in which the software is to be installed.

The software reception unit 830 receives software from an external apparatus which has received the request signal and security information. The software reception unit 830 may further include a verification unit 831 verifying falsification or forgery of the received software.

The software storage unit 840 permanently installs and stores the software received by the software reception unit 830. In this case, according to the copy permission information 720 included in the received additional information 710 through 750, the software may be stored separately from the additional information 710 through 750 so that the received software can be copied to another device other than the apparatus 800.

Figure 9:
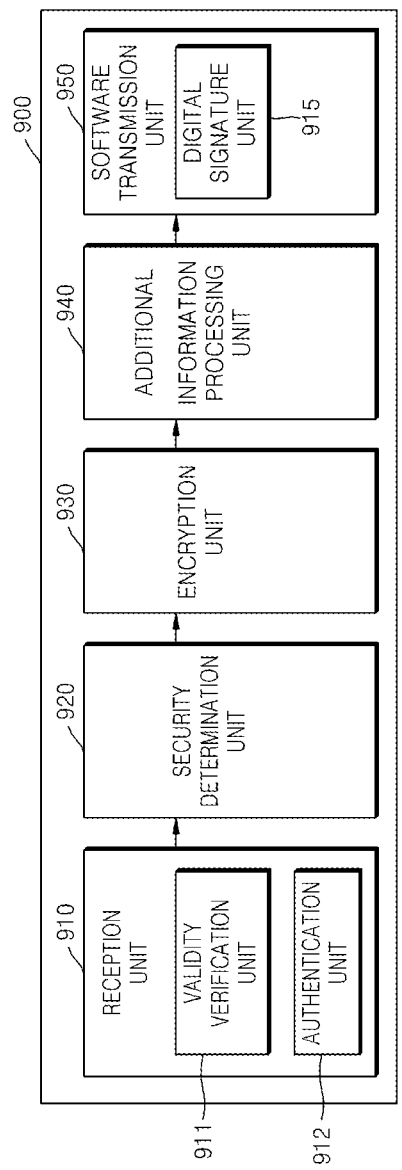
FIG. 9 is a functional block diagram of a software transmission server providing software for using digital content according to an exemplary embodiment of the present invention.

FIG. 9 is a functional block diagram of a software transmission server providing software for using digital content according to an exemplary embodiment of the present invention.

Referring to FIG. 9, the software transmission server 900 includes a reception unit 910, including a validity verification unit 911 examining a revocation list of devices, and a device authentication unit 912, a security determination unit 920, an encryption unit 930, an additional information processing unit 940, and a software transmission unit 950, including a digital signature unit 951 adding a signature of an authentication organization to software to be transmitted.

The reception unit 910 receives a request signal for software for using protected digital content, and first security information indicating the security status of a device in which the software is to be installed. The validity verification unit 911 examines whether the device requesting the software is included in a revocation list of devices, and the device authentication unit 912 authenticates the device.

The security determination unit 920 compares the first security information received by the reception unit 910 with second security information indicating the security status of the device required by the software, thereby determining whether the device satisfies the security requirements of the software.

The encryption unit 930 encrypts the software to be transmitted, thereby protecting the software. The additional information processing unit 940 inserts additional information, including copy permission information indicating whether the software can be coped to another device after being transmitted, device security information required by the software, a public key in relation to a secret key of the software itself, and a digital signature in relation to the additional information.

The software transmission unit 950 transmits the software to the device when it is basically determined in the security determination unit 920 that the security requirements are satisfied. In this case, a digital signature unit 951 performing a digital signature for determining falsification or forgery of the software packet which is encrypted and into which additional information is inserted may be further included.

In the above exemplary embodiments, the process in which the software is transmitted by an external apparatus, such as a server, and installed is explained. Also, software can be installed from an external storage medium such as a compact disk (CD) or a universal serial bus (USB) memory.

In this case, the software may be included in installation software stored in the external storage medium and by executing the installation software, the software can be installed in a device. In this process, as in the above exemplary embodiments in which the software is transmitted by the server and installed, the installation software reads security information from the device, and only when the device satisfies the security requirements required by the software, the installation software is controlled to install the software.

In this case, in order to prevent arbitrary installation of the content protection software included in the installation software without execution of the installation software, the content protection software may be encrypted with a key which only the installation software knows. In this case, the encrypted software is decrypted in the installation process and then installed.

According to the method and apparatus for installing software of the present invention as described above, unlike the conventional method in which a predetermined content protection technology is fixedly mounted on a content device and used, content protection software can be dynamically installed, and at the same time, the installation can be securely performed using the software.

Accordingly, content protection software capable of using a variety of digital contents can be securely installed in a device, thereby enhancing utilization of the device.

The exemplary embodiments of the method of installing software according to the present invention described above can be written as computer programs and can be implemented in general-use digital computers that execute the programs using a computer readable recording medium.

Also, the data structure used in the exemplary embodiments of the present invention described above can be recorded on a computer readable recording medium through a variety of ways.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of installing a content protection system in a device for using digital content in the device, the method comprising:
   transmitting a request for the content protection system required for decrypting the digital content in the device based on a type of a protection technology applied to the digital content;
   receiving the content protection system, based on the type of the protection technology applied to the digital content, from an external apparatus; and
   installing the received content protection system in a storage unit of the device.

2. The method of claim 1, wherein the content protection system is received further based on a security information, the security information related to a security level of the device from among a plurality of security levels or related to whether at least one security item is protected in the device.

3. The method of claim 2, further comprising authenticating the device, wherein the security information is included in a certificate of the device which is transmitted for authentication.

4. The method of claim 3, wherein the certificate of the device further includes at least one of an identification code of the device, a public key of the device and a digital signature guaranteeing a genuineness of the certificate.

5. The method of claim 1, wherein in the receiving the content protection system, additional information on the content protection system and a digital signature for preventing falsification or forgery of the content protection system are received.

6. The method of claim 5, wherein the additional information includes copy permission information indicating whether the content protection system can be copied to another device, or required security information related to a security level of the device required by the content protection system.

7. The method of claim 6, further comprising storing the content protection system separately from the additional information according to the copy permission information included in the additional information so that the content protection system can be copied to the other device.

8. The method of claim 7, further comprising verifying falsification or forgery of the received content protection system.

9. A method of claim 1, wherein the transmitting comprises transmitting security information of the device.

10. A method of claim 9, wherein the security information of the device comprises security information related to a security level of the device.

11. A method of allowing installation of a content protection system for using digital content, the method, performed by a server, comprising:
    receiving a request for the content protection system required for decrypting the digital content in a device based on a type of a protection technology applied to the digital content;
    receiving first security information of the device;

comparing the received first security information with second security information related to a security level required by the content protection system; and transmitting the content protection system according to a result of the comparing.

12. The method of claim 11, wherein the first security information is related to the security level of the device from among a plurality of levels or related to whether at least one security item is protected in the device.

13. The method of claim 12, wherein in the transmitting the content protection system, if the first security information is related to the security level of the device from among the plurality of levels, the content protection system is transmitted if the security level of the device is equal to or higher than the level required by the second security information.

14. The method of claim 12, wherein in the transmitting the content protection system, if the first security information is related to whether at least one security item is protected in the device, the content protection system is transmitted if the first security information satisfies protection of each security item required by the second security information.

15. The method of claim 11, wherein the content protection system to be transmitted is encrypted and then transmitted, and additional information on the content protection system is transmitted together with the content protection system.

16. The method of claim 15, wherein the additional information includes copy permission information indicating whether the content protection system can be copied to another device, or the second security information.

17. The method of claim 11, further comprising determining whether the device requesting the content protection system is included in a revocation list of devices, wherein transmission of the content protection system is refused if it is determined that the device is included in the revocation list.

18. The method of claim 11, further comprising authenticating the device requesting the content protection system, wherein transmission of the content protection system is refused if authentication fails.

19. The method of claim 18, further comprising performing a digital signature for determining whether the content protection system to be transmitted is falsified or forged.

20. An apparatus for playing digital content, the apparatus comprising:
a content protection system request unit which transmits a request for content protection system required for decrypting the digital content in the device based on a type of a protection technology applied to the digital content;
a content protection system reception unit which receives the content protection system based on the type of the protection technology applied to the digital content, from an external apparatus; and
a content protection system storage unit in which the received content protection system is installed.

21. The apparatus of claim 20, wherein the content protection system request unit further includes an authentication processing unit which performs authentication of the device which is requested by the external apparatus.

22. The apparatus of claim 21, wherein the content protection system reception unit further includes a verification unit verifying whether or not the received content protection system is falsified or forged.

23. An apparatus for transmitting content protection system, the apparatus comprising:
a reception unit which receives a request for a content protection system required for decrypting digital content in a device based on a type of a protection technology applied to the digital content and receives first security information of the device;
a security determination unit which compares the first security information received by the reception unit with second security information related to a security level required by the content protection system; and
a content protection system transmission unit which transmits the content protection system according to a result of the comparison by the security determination unit.

24. The apparatus of claim 23, wherein the reception unit includes a validity verification unit which determines whether the device requesting the content protection system is included in a revocation list of devices.

25. The apparatus of claim 24, wherein the reception unit further includes an authentication unit which authenticates the device requesting the content protection system.

26. The apparatus of claim 25, further comprising:
an encryption unit which encrypts the content protection system to be transmitted; and
an additional information processing unit which adds additional information on the content protection system to the content protection system to be transmitted.

27. The apparatus of claim 25, wherein the content protection system transmission unit further includes a digital signature unit which performs a digital signature for determining whether the content protection system to be transmitted is falsified or forged.

28. A non-transitory computer readable recording medium having embodied thereon a computer program for executing the method of installing content protection system of claim 1.

* * * * *